US010823411B2

(12) United States Patent
Quach et al.

(10) Patent No.: US 10,823,411 B2
(45) Date of Patent: Nov. 3, 2020

(54) COMBUSTOR LINER PANEL END RAIL COOLING ENHANCEMENT FEATURES FOR A GAS TURBINE ENGINE COMBUSTOR

(71) Applicant: United Technologies Corporation, Farmington, CT (US)

(72) Inventors: San Quach, Southington, CT (US); Jeffrey T. Morton, Manchester, CT (US); Matthew D. Parekh, Farmington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 554 days.

(21) Appl. No.: 15/440,760

(22) Filed: Feb. 23, 2017

(65) Prior Publication Data
US 2018/0238546 A1    Aug. 23, 2018

(51) Int. Cl.
F23R 3/00 (2006.01)
F23R 3/42 (2006.01)
F23R 3/50 (2006.01)
F02K 1/82 (2006.01)

(52) U.S. Cl.
CPC .............. *F23R 3/002* (2013.01); *F23R 3/005* (2013.01); *F23R 3/42* (2013.01); *F23R 3/50* (2013.01); *F02K 1/822* (2013.01); *F05D 2260/202* (2013.01); *F23R 2900/00017* (2013.01); *F23R 2900/03041* (2013.01);
(Continued)

(58) Field of Classification Search
CPC .... F23R 3/002; F23R 3/06; F23R 3/50; F23R 3/60; F23R 2900/03044; F05D 2260/201; F05D 2260/221; F05D 2260/2212; F05D 2260/2214; F05D 2260/22141
See application file for complete search history.

(56) References Cited

U.S. PATENT DOCUMENTS 3,965,066 A    6/1976    Sterman
4,030,875 A    6/1977    Grondahl et al.
4,253,301 A    3/1981    Vogt
(Continued)

FOREIGN PATENT DOCUMENTS

EP    1507116 A1    2/2005
EP    3211319 A1    8/2017
(Continued)

OTHER PUBLICATIONS

U.S. Non-Final Office Action dated May 14, 2019 for corresponding U.S. Appl. No. 15/440,677.
(Continued)

*Primary Examiner* — Gerald L Sung
*Assistant Examiner* — Colin J Paulauskas
(74) *Attorney, Agent, or Firm* — Bachman & LaPointe, P.C.

(57) ABSTRACT

A combustor for a gas turbine engine includes a support shell; a first liner panel mounted to the support shell via a multiple of studs, the first liner panel including a first rail that extends from a cold side of the first liner panel; a second liner panel mounted to the support shell via a multiple of studs, the second liner panel including a second rail that extends from a cold side of the second liner panel adjacent to the first rail to form an interface passage; and at least one heat transfer feature within the interface passage.

12 Claims, 9 Drawing Sheets

(52) U.S. Cl.
CPC .............. *F23R 2900/03042* (2013.01); *F23R 2900/03044* (2013.01); *F23R 2900/03045* (2013.01); *Y02T 50/675* (2013.01)

(56) References Cited

U.S. PATENT DOCUMENTS

| | | | |
|---|---|---|---|
| 4,567,730 A | 2/1986 | Scott | |
| 4,614,082 A | 9/1986 | Sterman et al. | |
| 4,655,044 A | 4/1987 | Dierberger et al. | |
| 4,776,790 A | 10/1988 | Woodruff | |
| 4,944,151 A | 7/1990 | Hovnanian | |
| 5,333,433 A | 8/1994 | Porambo et al. | |
| 5,363,643 A | 11/1994 | Halila | |
| 5,419,115 A | 5/1995 | Butler et al. | |
| 5,956,955 A | 9/1999 | Schmid | |
| 5,996,335 A | 12/1999 | Ebel | |
| 6,029,455 A | 2/2000 | Sandelis | |
| 6,276,142 B1 | 8/2001 | Putz | |
| 6,497,105 B1 | 12/2002 | Stastny | |
| 6,675,586 B2 | 1/2004 | Maghon | |
| 6,901,757 B2 | 6/2005 | Gerendas | |
| 7,021,061 B2 | 4/2006 | Tiemann | |
| 7,089,748 B2 | 8/2006 | Tiemann | |
| 7,299,622 B2 | 11/2007 | Häggander | |
| 7,464,554 B2 | 12/2008 | Cheung et al. | |
| 7,677,044 B2 | 3/2010 | Barbeln et al. | |
| 7,770,398 B2 | 8/2010 | De Sousa et al. | |
| 7,900,461 B2 | 3/2011 | Varney et al. | |
| 8,104,287 B2 | 1/2012 | Fischer et al. | |
| 8,266,914 B2 | 9/2012 | Hawie et al. | |
| 8,418,470 B2 | 4/2013 | Burd | |
| 8,661,826 B2 | 3/2014 | Garry et al. | |
| 8,683,806 B2 | 4/2014 | Commaret et al. | |
| 8,984,896 B2 | 3/2015 | Davenport et al. | |
| 10,215,411 B2 | 2/2019 | Tu et al. | |
| 2001/0029738 A1 | 10/2001 | Pidcock et al. | |
| 2004/0182085 A1 | 9/2004 | Jeppel et al. | |
| 2005/0150632 A1 | 7/2005 | Mayer et al. | |
| 2006/0053798 A1 | 3/2006 | Hadder | |
| 2008/0115499 A1 | 5/2008 | Patel et al. | |
| 2008/0282703 A1 | 11/2008 | Morenko et al. | |
| 2009/0077974 A1 | 3/2009 | Dahlke et al. | |
| 2009/0199837 A1 | 8/2009 | Tschirren et al. | |
| 2011/0185739 A1 | 8/2011 | Bronson et al. | |
| 2011/0185740 A1 | 8/2011 | Dierberger et al. | |
| 2012/0272521 A1 | 11/2012 | Lee et al. | |
| 2013/0180252 A1* | 7/2013 | Chen ...................... | F23R 3/002 60/754 |
| 2014/0033723 A1 | 2/2014 | Doerr et al. | |
| 2014/0202163 A1* | 7/2014 | Johnson .................. | B22F 5/009 60/752 |
| 2014/0360196 A1 | 12/2014 | Graves et al. | |
| 2015/0330633 A1 | 11/2015 | Graves et al. | |
| 2016/0054001 A1 | 2/2016 | Bangerter et al. | |
| 2016/0061448 A1* | 3/2016 | Davenport ............. | F23R 3/005 60/754 |
| 2016/0123594 A1 | 5/2016 | Cunha et al. | |
| 2016/0201909 A1 | 7/2016 | Bangerter et al. | |
| 2016/0201914 A1 | 7/2016 | Drake | |
| 2016/0230996 A1 | 8/2016 | Kostka et al. | |
| 2016/0238247 A1 | 8/2016 | Stauffer | |
| 2016/0252249 A1 | 9/2016 | Erbas-Sen et al. | |
| 2016/0258626 A1 | 9/2016 | Moura et al. | |
| 2016/0265772 A1 | 9/2016 | Eastwood et al. | |
| 2016/0265784 A1 | 9/2016 | Bangerter et al. | |
| 2016/0273772 A1 | 9/2016 | Cunha et al. | |
| 2016/0377296 A1 | 12/2016 | Bangerter et al. | |
| 2017/0159935 A1 | 6/2017 | Drake et al. | |
| 2017/0176005 A1 | 6/2017 | Rimmer et al. | |
| 2017/0184306 A1 | 6/2017 | Tu et al. | |
| 2017/0234226 A1 | 8/2017 | Jones | |
| 2017/0241643 A1* | 8/2017 | Mulcaire ................. | F23R 3/002 |
| 2017/0254538 A1 | 9/2017 | Tu et al. | |
| 2017/0268776 A1 | 9/2017 | Willis et al. | |
| 2017/0356653 A1 | 12/2017 | Bagchi et al. | |
| 2018/0231251 A1 | 8/2018 | Burd | |
| 2018/0238179 A1 | 8/2018 | Quach et al. | |
| 2018/0238545 A1 | 8/2018 | Quach et al. | |
| 2018/0238547 A1 | 8/2018 | Quach et al. | |
| 2018/0266689 A1 | 9/2018 | Kramer et al. | |
| 2018/0306113 A1 | 10/2018 | Morton et al. | |
| 2018/0335211 A1 | 11/2018 | Quach et al. | |
| 2018/0363902 A1 | 12/2018 | Peters et al. | |
| 2019/0195495 A1 | 6/2019 | Moura et al. | |

FOREIGN PATENT DOCUMENTS

| | | |
|---|---|---|
| GB | 2298266 A | 8/1996 |
| GB | 2317005 A | 3/1998 |
| GB | 2355301 A | 4/2001 |
| GB | 2361304 A | 10/2001 |
| WO | 2014169127 A1 | 10/2014 |
| WO | 2015038232 A1 | 3/2015 |
| WO | 2015050879 A1 | 4/2015 |
| WO | 2015065579 A1 | 5/2015 |
| WO | 2015077600 A1 | 5/2015 |
| WO | 2015084444 A1 | 6/2015 |
| WO | 2015094430 A1 | 6/2015 |
| WO | 2015112216 A2 | 7/2015 |
| WO | 2015112220 A2 | 7/2015 |

OTHER PUBLICATIONS

U.S.Non-Final Office Action dated Jul. 18, 2019 for corresponding U.S. Appl. No. 15/432,098.
European Search Report dated Jun. 27, 2018 for corresponding European Patent Application No. 18158215.6.
European Search Report dated Jun. 25, 2018 for corresponding European Patent Application No. 18158208.1.
European Search Report dated Jul. 19, 2018 for corresponding European Patent Application No. 18162763.9.
European Search Report dated Jul. 2, 2018 for corresponding European Patent Application No. 18158221.4.
European Search Report dated Jul. 9, 2018 for corresponding European Patent Application No. 18158210.7.
European Search Report dated Jun. 25, 2018 for corresponding European Patent Application No. 18156681.1.
U.S.Non-Final Office Action dated Jun. 12, 2019 for corresponding U.S. Appl. No. 15/440,739.
European Office Action dated Nov. 4, 2019 for corresponding EP Patent Application No. 18158208.1.
European Office Action dated Oct. 11, 2019 for corresponding EP Patent Application No. 18158221.4.
U.S. Non-Final Office Action dated Nov. 26, 2019 for corresponding U.S. Appl. No. 15/440,677.
U.S. Non-Final Office Action dated Mar. 3, 2020 for corresponding U.S. Appl. No. 15/463,168.

* cited by examiner

COMBUSTOR LINER PANEL END RAIL COOLING ENHANCEMENT FEATURES FOR A GAS TURBINE ENGINE COMBUSTOR

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber formed by an inner and outer wall assembly. Each wall assembly includes a support shell lined with heat shields often referred to as liner panels. Combustor panels are often employed in modern annular gas turbine combustors to form the inner flow path. The panels are part of a two-wall liner and are exposed to a thermally challenging environment.

In typical combustor chamber designs, combustor Impingement Film-Cooled Floatwall (IFF) liner panels typically include a hot side exposed to the gas path. The opposite, or cold side, has features such as cast in threaded studs to mount the liner panel and a full perimeter rail that contact the inner surface of the liner shells.

The wall assemblies are segmented to accommodate growth of the panels in operation and for other considerations. Combustor panels typically have a quadrilateral projection (i.e. rectangular or trapezoid) when viewed from the hot surface. The panels have a straight edge that forms the front or upstream edge of the panel and a second straight edge that forms the back or downstream edge of the combustor. The panels also have side edges that are linear in profile.

The liner panels extend over an arc in a conical or cylindrical fashion in a plane and terminate in regions where the combustor geometry transitions, diverges, or converges. This may contribute to durability and flow path concerns where forward and aft panels merge or form interfaces. These areas can be prone to steps between panels, dead regions, cooling challenges and adverse local aerodynamics.

SUMMARY

A liner panel for use in a combustor of a gas turbine engine according to one disclosed non-limiting embodiment of the present disclosure can include a cold side; and a rail that extends from the cold side, the rail includes a surface with at least one heat transfer feature.

A further embodiment of the present disclosure may include the rail at least partially forms an interface passage.

A further embodiment of the present disclosure may include the rail is angled with respect to the cold side.

A further embodiment of the present disclosure may include the liner panel is at least one of a forward liner panel, and an aft liner panel.

A further embodiment of the present disclosure may include the rail is a forward rail of an aft liner panel.

A further embodiment of the present disclosure may include the rail is an aft rail of a forward liner panel.

A further embodiment of the present disclosure may include the rail is a periphery rail.

A further embodiment of the present disclosure may include the heat transfer features are arranged in rows.

A further embodiment of the present disclosure may include the heat transfer features are shaped as at least one of pins, circles, ovals, and racetracks.

A combustor for a gas turbine engine according to one disclosed non-limiting embodiment of the present disclosure can include a support shell; a first liner panel mounted to the support shell via a multiple of studs, the first liner panel including a first rail that extends from a cold side of the first liner panel; a second liner panel mounted to the support shell via a multiple of studs, the second liner panel including a second rail that extends from a cold side of the second liner panel adjacent to the first rail to form an interface passage; and at least one heat transfer feature within the interface passage.

A further embodiment of the present disclosure may include the at least one heat transfer feature extends from a surface of the first rail that faces the interface passage.

A further embodiment of the present disclosure may include the at least one heat transfer feature extends from a surface of the second rail that faces the interface passage.

A further embodiment of the present disclosure may include the at least one heat transfer feature includes a first heat transfer feature that extends from a surface of the first rail that faces the interface passage, and the at least one heat transfer feature includes a second heat transfer feature that extends from a surface of the second rail that faces the interface passage.

A further embodiment of the present disclosure may include the first heat transfer feature abuts the second heat transfer feature across the interface passage.

A further embodiment of the present disclosure may include the second liner panel is an aft liner panel.

A further embodiment of the present disclosure may include the second rail is a forward rail.

A further embodiment of the present disclosure may include the heat transfer features are arranged in rows.

A further embodiment of the present disclosure may include the heat transfer features are shaped as at least one of pins, circles, ovals, and racetracks.

A method for cooling a combustor liner panel for a gas turbine engine according to one disclosed non-limiting embodiment of the present disclosure can include communicating airflow through an interface passage having at least one heat transfer feature.

A further embodiment of the present disclosure may include communicating the airflow through the interface passage at an angle toward a downstream liner panel to increase surface attachment thereto.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
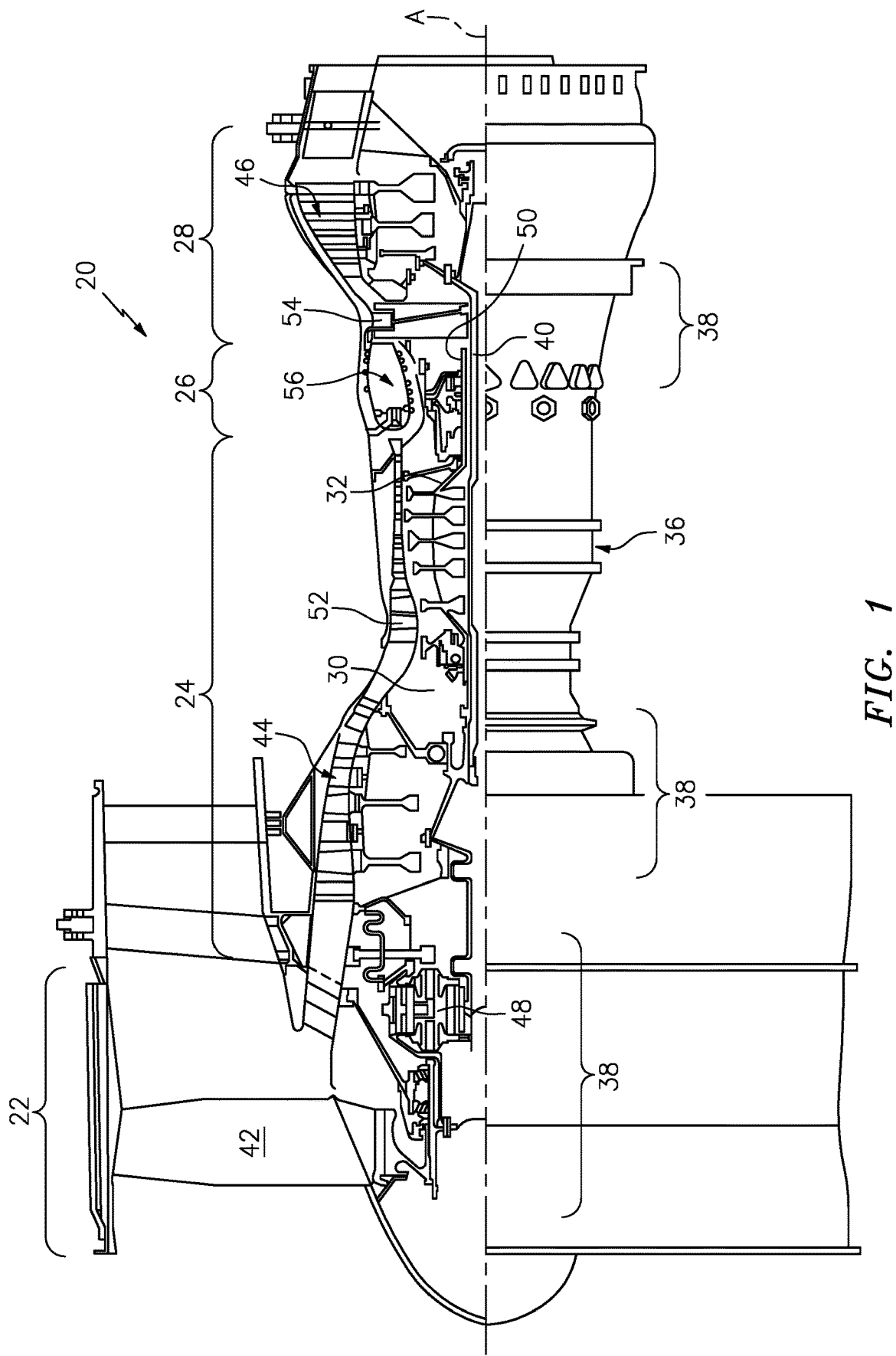
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures might include an augmentor section among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet (10,668 m). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
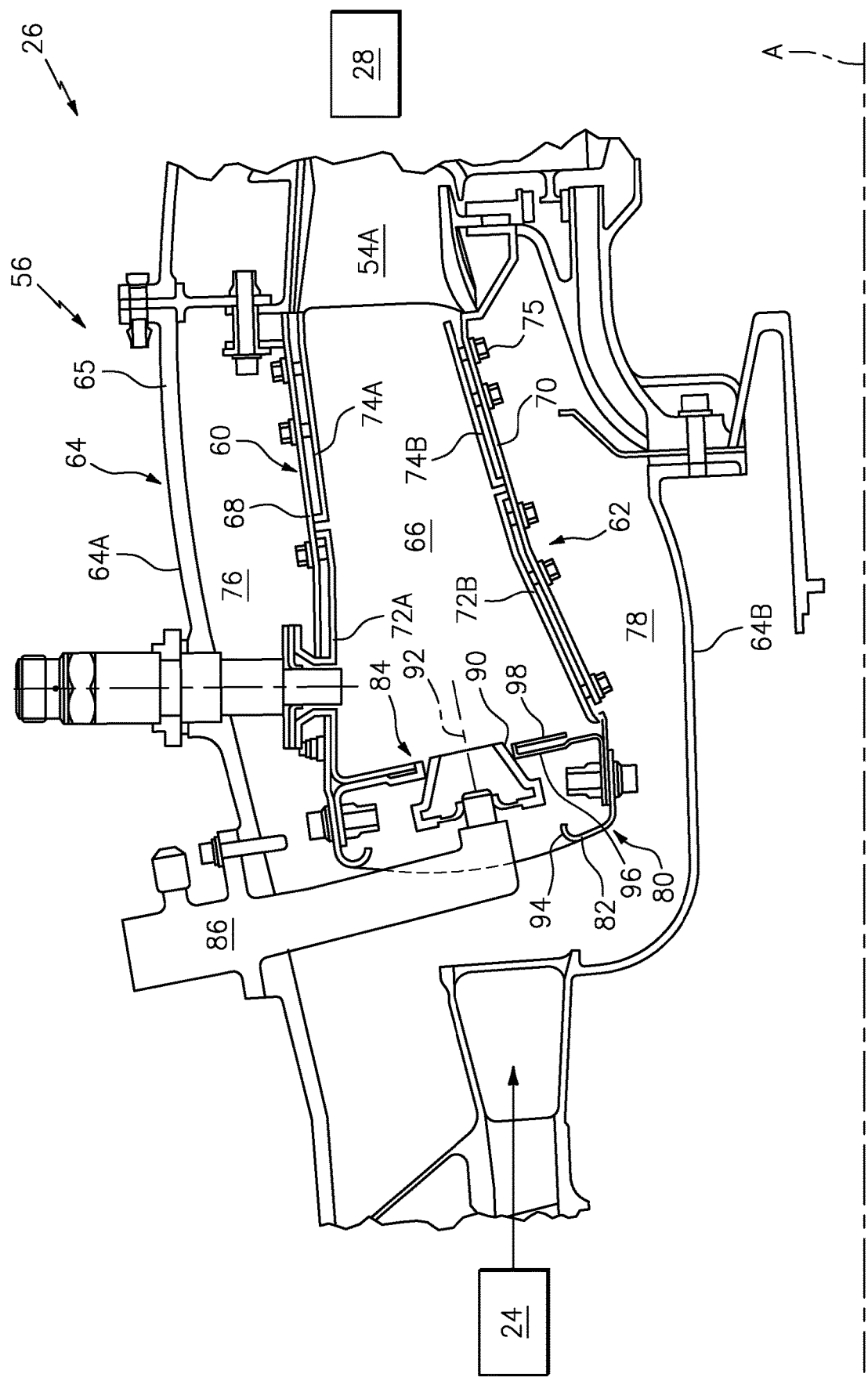
FIG. 2 is an expanded longitudinal schematic sectional view of a combustor section according to one non-limiting embodiment that may be used with the example gas turbine engine architectures.

With reference to FIG. 2, the combustor section 26 generally includes a combustor 56 with an outer combustor wall assembly 60, an inner combustor wall assembly 62, and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be appreciated that although a particular combustor is illustrated, other combustor types with various combustor liner arrangements will also benefit herefrom. It should be further appreciated that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 74A that are circumferentially staggered to line the outer shell 68. A multiple of forward liner panels 72B and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
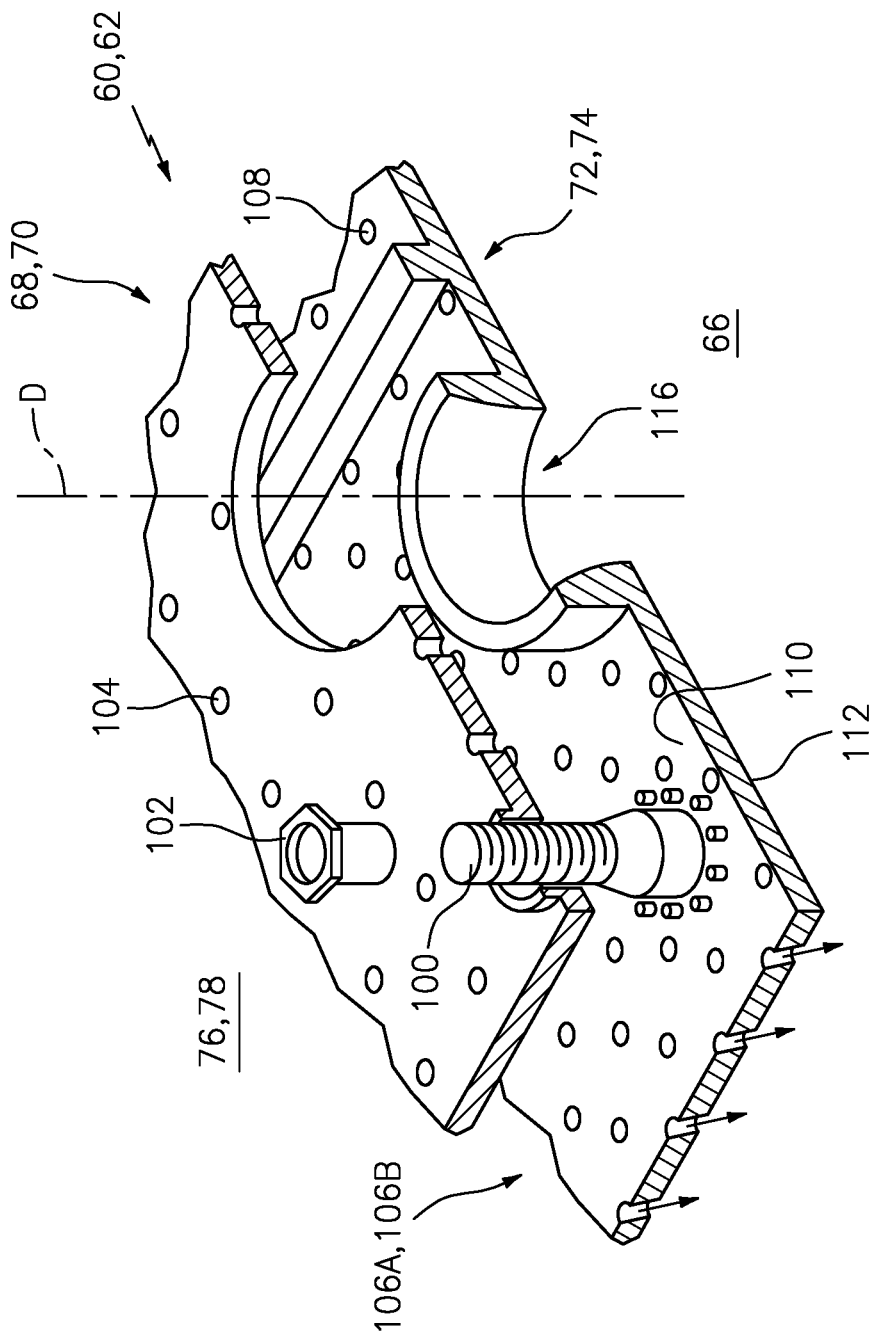
FIG. 3 is an exploded partial sectional view of a portion of a combustor wall assembly.

With reference to FIG. 3, a multiple of studs 100 extend from each of the liner panels 72, 74 so as to permit a liner array (partially shown in FIG. 4) of the liner panels 72, 74 to be mounted to their respective support shells 68, 70 with fasteners 102 such as nuts. That is, the studs 100 project rigidly from the liner panels 72, 74 to extend through the respective support shells 68, 70 and receive the fasteners 102 on a threaded section thereof (FIG. 5).

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The impingement passages 104 are generally normal to the surface of the liner panels 72, 74. The air in the cavities 106 provides cold side impingement cooling of the liner panels 72, 74 that is generally defined herein as heat removal via internal convection.

A multiple of effusion passages 108 penetrate through each of the liner panels 72, 74. The geometry of the passages, e.g., diameter, shape, density, surface angle, incidence angle, etc., as well as the location of the passages with respect to the high temperature combustion flow also contributes to effusion cooling. The effusion passages 108 allow the air to pass from the cavities 106 defined in part by a cold side 110 of the liner panels 72, 74 to a hot side 112 of the liner panels 72, 74 and thereby facilitate the formation of a thin, relatively cool, film of cooling air along the hot side 112.

Figure 6:
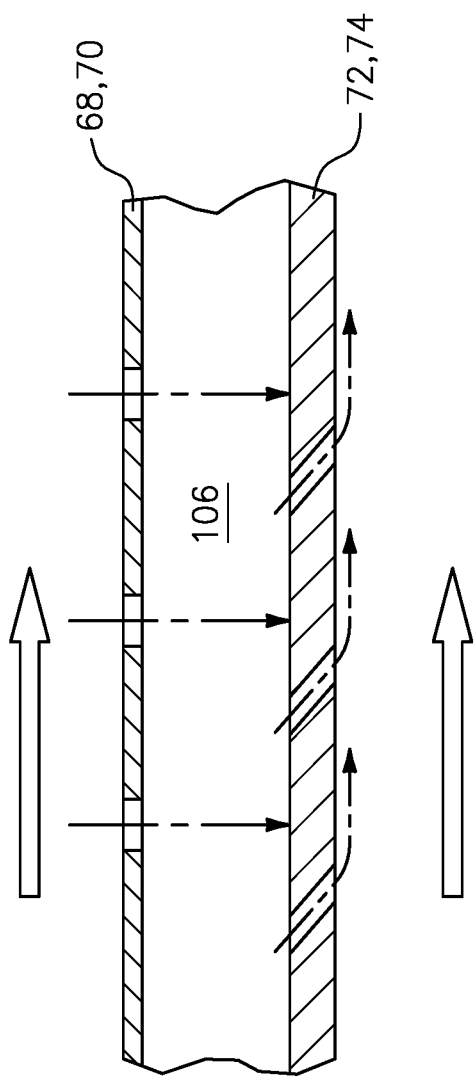
FIG. 6 is a sectional view of a portion of a combustor wall assembly.

In one disclosed non-limiting embodiment, each of the multiple of effusion passages 108 are typically 0.01-0.05 inches (0.254-1.27 mm) in diameter and define a surface angle of about 15-90 degrees with respect to the cold side 110 of the liner panels 72, 74. The effusion passages 108 are generally more numerous than the impingement passages 104 and promote film cooling along the hot side 112 to sheath the liner panels 72, 74 (FIG. 6). Film cooling as defined herein is the introduction of a relatively cooler air at one or more discrete locations along a surface exposed to a high temperature environment to protect that surface in the region of the air injection as well as downstream thereof.

The combination of impingement passages 104 and effusion passages 108 may be referred to as an Impingement Film Floatwall (IFF) assembly. A multiple of dilution passages 116 are located in the liner panels 72, 74 each along a common axis D. For example only, the dilution passages 116 are located in a circumferential line W (shown partially in FIG. 4). Although the dilution passages 116 are illustrated in the disclosed non-limiting embodiment as within the aft liner panels 74A, 74B, the dilution passages may alternatively be located in the forward liner panels 72A, 72B or in a single liner panel which replaces the fore/aft liner panel array. Further, the dilution passages 116 although illustrated in the disclosed non-limiting embodiment as integrally formed in the liner panels, it should be appreciated that the dilution passages 116 may be separate components. Whether integrally formed or separate components, the dilution passages 116 may be referred to as grommets.

Figure 4:
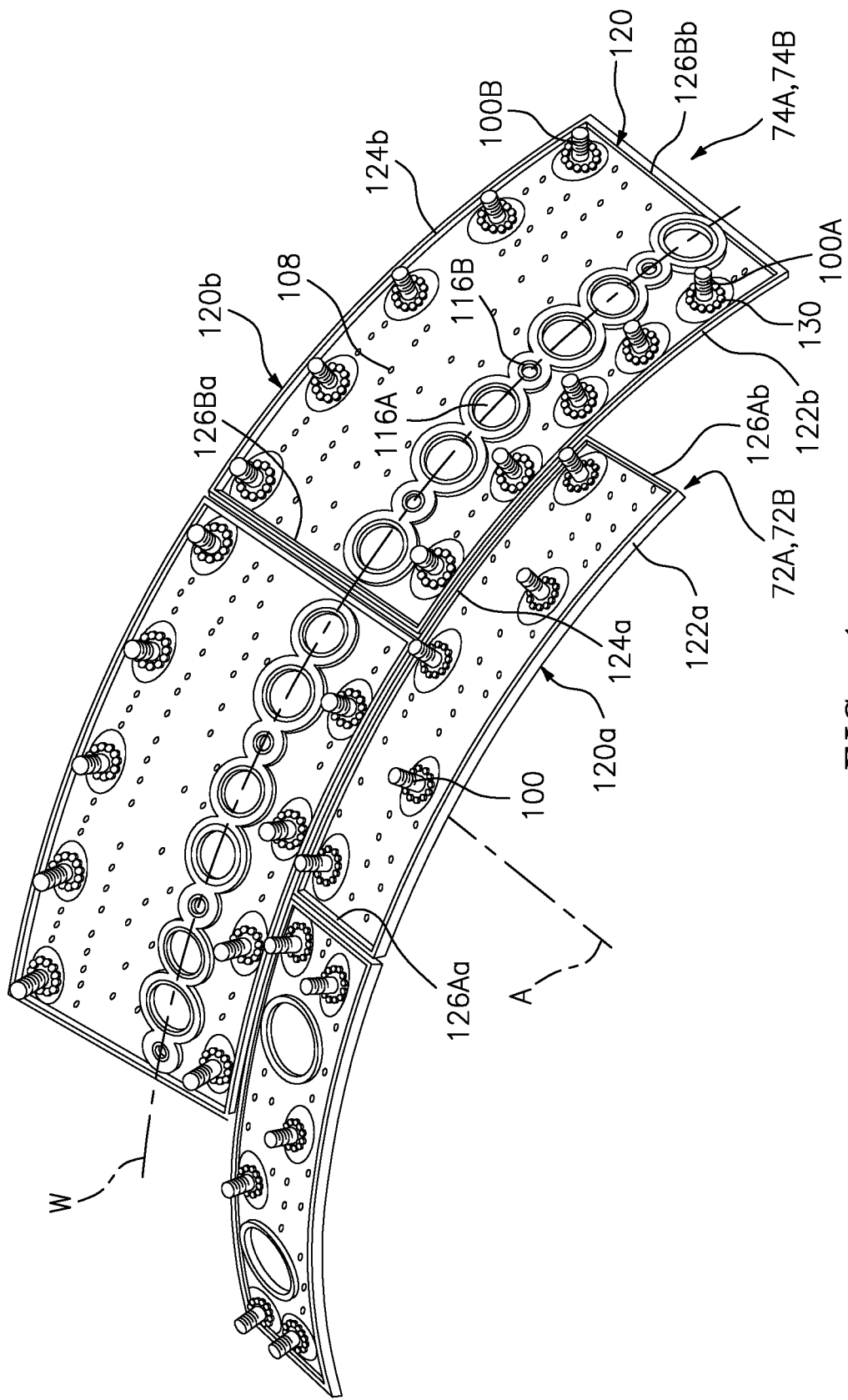
FIG. 4 is a perspective cold side view of a portion of a liner panel array.
Figure 5:
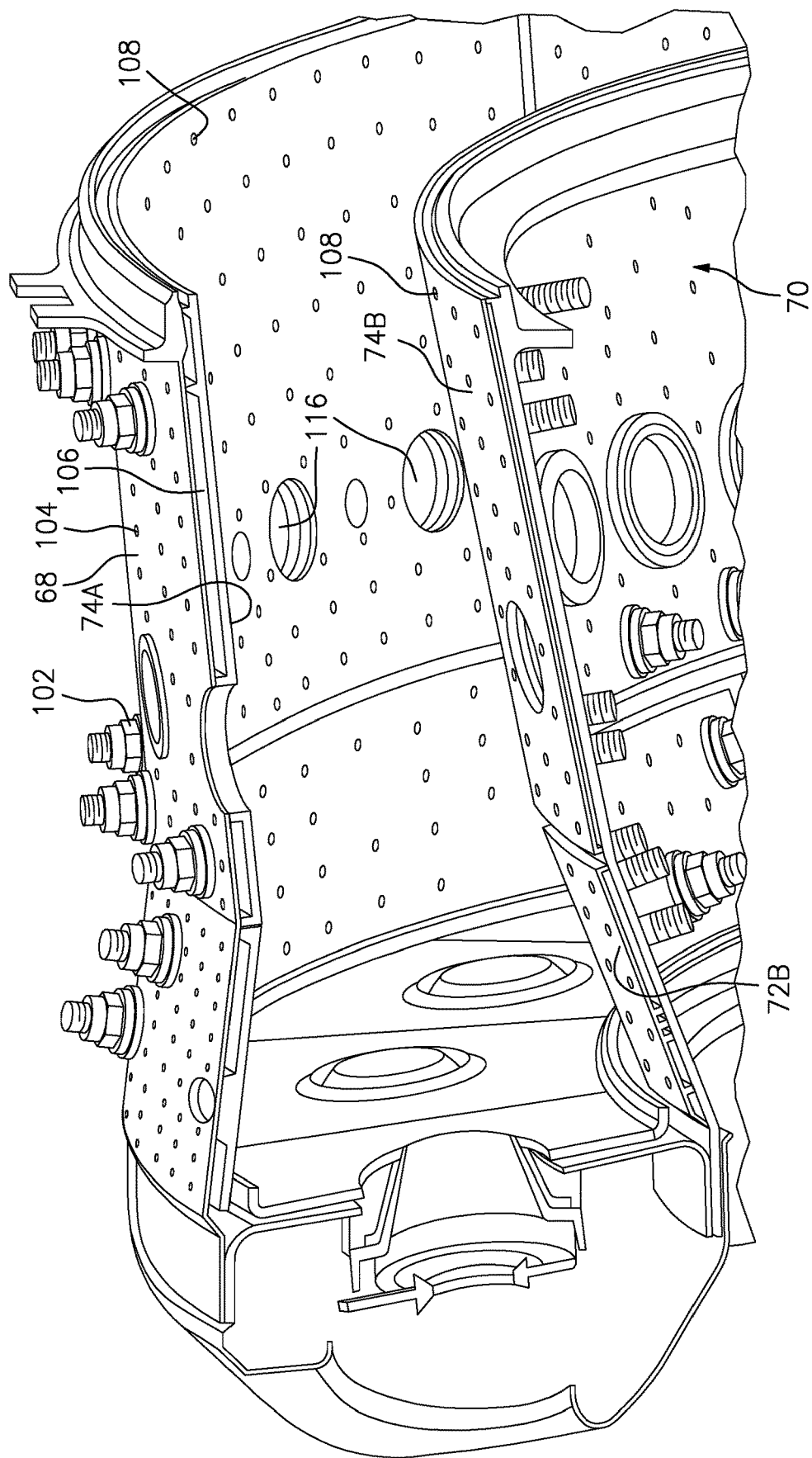
FIG. 5 is a perspective partial sectional view of a combustor.

With reference to FIG. 4, in one disclosed non-limiting embodiment, each of the forward liner panels 72A, 72B, and the aft liner panels 74A, 74B in the liner panel array includes a perimeter rail 120a, 120b formed by a forward circumferential rail 122a, 122b, an aft circumferential rail 124a, 124b, and axial rails 126Aa, 126Ab, 126Ba, 126Bb, that interconnect the forward and aft circumferential rails 122a, 122b, 124a, 124b. The perimeter rail 120 seals each liner panel with respect to the respective support shell 68, 70 to form the impingement cavity 106 therebetween. That is, the forward and aft circumferential rails 122a, 122b, 124a, 124b are located at relatively constant curvature shell interfaces while the axial rails 126Aa, 126Ab, 126Ba, 126Bb, extend across an axial length of the respective support shell 68, 70 to complete the perimeter rail 120a, 120b that seals the forward liner panels 72A, 72B, and the aft liner panels 74A, 74B to the respective support shell 68, 70.

A multiple of studs 100 are located adjacent to the respective forward and aft circumferential rails 122a, 122b, 124a, 124b. Each of the studs 100 may be at least partially surrounded by posts 130 to at least partially support the fastener 102 and provide a stand-off between each forward liner panels 72A, 72B, and the aft liner panels 74A, 74B and respective support shell 68, 70.

The dilution passages 116 are located downstream of the forward circumferential rail 122b in the aft liner panels 74A, 74B to quench the hot combustion gases within the combustion chamber 66 by direct supply of cooling air from the respective annular plenums 76, 78. That is, the dilution passages 116 pass air at the pressure outside the combustion chamber 66 directly into the combustion chamber 66.

This dilution air is not primarily used for cooling of the metal surfaces of the combustor shells or panels, but to condition the combustion products within the combustion chamber 66. In this disclosed non-limiting embodiment, the dilution passages 116 include at least one set of circumferentially alternating major dilution passages 116A and minor dilution passages 116B. That is, in some circumferentially offset locations, two major dilution passages 116A are separated by one minor dilution passages 116B. Here, every two major dilution passages 116A are separated by one minor dilution passages 116B but may still be considered "circumferentially alternating" as described herein.

Figure 7:
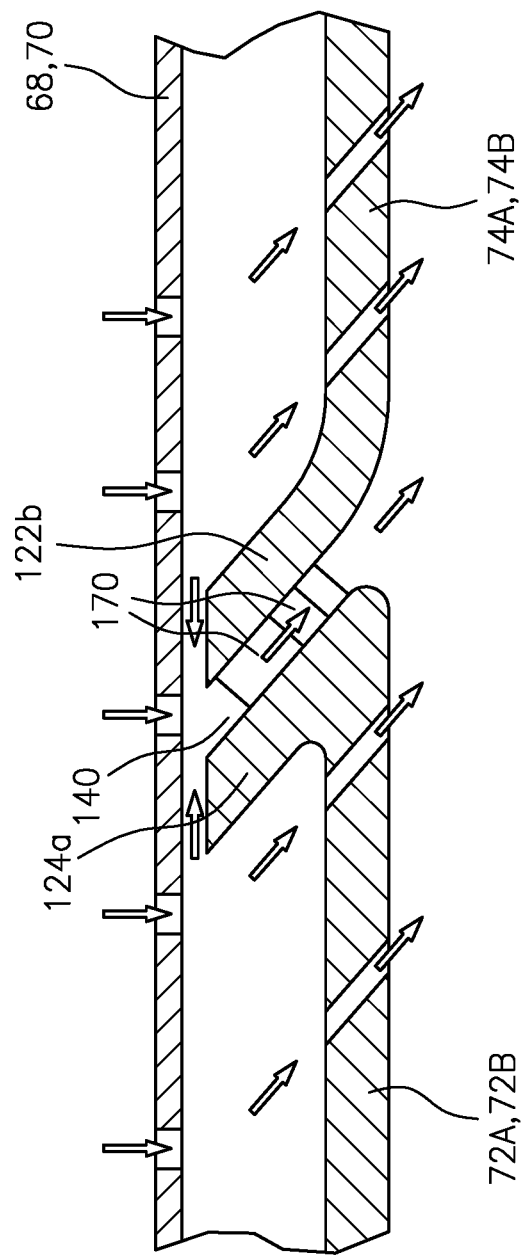
FIG. 7 is a sectional view of a combustor wall assembly with an end rail with heat transfer features.

With reference to FIG. 7, in one embodiment, the aft circumferential rail 124a of the forward liner panel 72A, 72B is adjacent to the forward circumferential rail 122b of the aft liner panel 74A, 74B.

Figure 8:
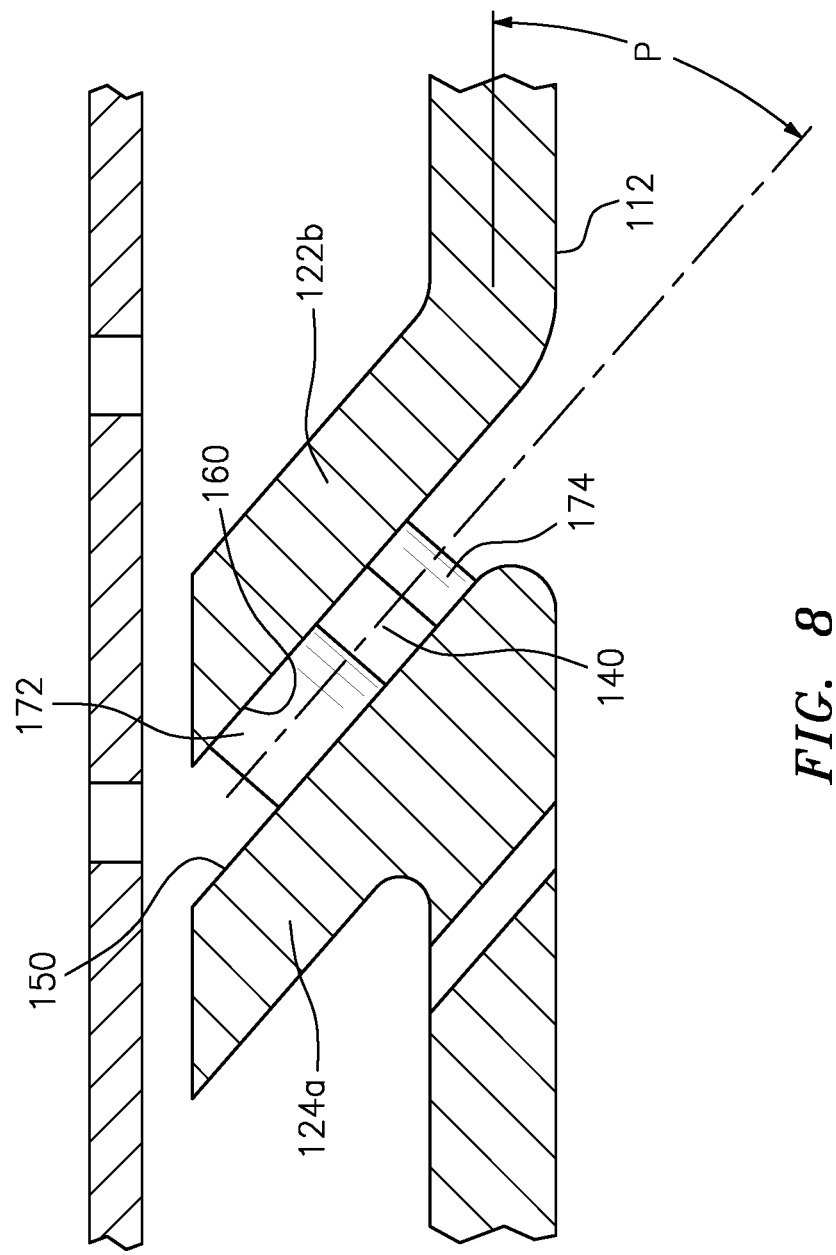
FIG. 8 is an expanded sectional view of a combustor wall assembly with an end rail with heat transfer features.

In one embodiment, an interface passage 140 is formed where the aft circumferential rail 124a of the forward liner panel 72A, 72B abuts the forward circumferential rail 122b of the aft liner panel 74A, 74B. It should be appreciated that other rail interfaces such as axial rail abutments may also benefit herefrom. The interface passage 140 is oriented at an angle P (FIG. 8) to the generally axial gaspath flow though the combustor 66. In one example, the interface passage 140 is oriented at an angle P between about 20-80 degrees with respect to the hot side 112 of the aft liner panel 74A, 74B. Other orientations such as perpendicular will also benefit herefrom.

Figure 9:
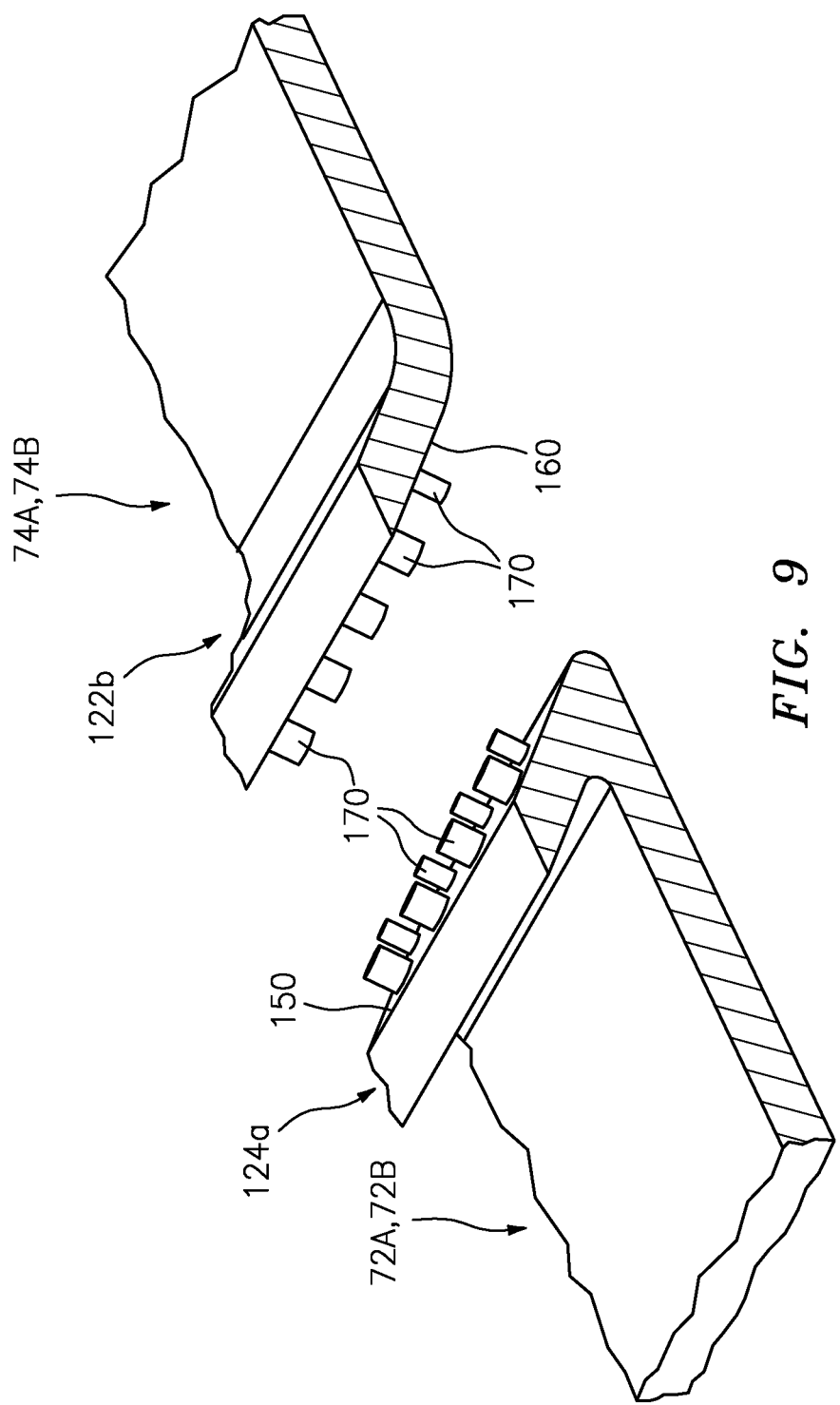
FIG. 9 is a perspective view of two adjacent liner panels.

The aft circumferential rail 124a, 124b includes an aft surface 150 (FIGS. 8 and 9) that faces toward a forward surface 160 of the forward circumferential rail 122a, 122b. The aft surface 150 and the forward surface 160 define the interface passage 140 therebetween. Either or both of the aft surface 150 and/or the forward surface 160 include a multiple of heat transfer features 170. The heat transfer features 170 may be of various shapes to include, but not be limited to, pins, circles, ovals, racetracks, and or combinations thereof. Further, the heat transfer features 170 may be arrayed in rows 172, 174 (only two rows shown).

The heat transfer features 170 facilitate a predefined gap space between the aft surface 150 and the forward surface 160. In one example, the heat transfer features 170 may be split between both the aft surface 150 and the forward surface 160.

That is, in this example, the heat transfer features 170 assure a desired interface passage 140 space between the aft circumferential rail 124a, 124b and the forward circumferential rail 122a, 122b. In addition, the heat transfer features 170 increase the rate of conduction from the aft circumferential rail 124a, 124b and the forward circumferential rail 122a, 122b as the cooling airflow passes through the interface passage 140.

The heat transfer features 170 increases cooling, while the shapes thereof condition the exit flow to increase surface attachment and optimize the attenuation of the film cooling flow onto the downstream aft liner panel 74A, 74B to increase combustor durability and time on wing.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor for a gas turbine engine comprising:
   a support shell;
   a forward liner panel mounted to the support shell via a multiple of studs, the forward liner panel including an aft rail that extends linearly from a cold side of the forward liner panel;
   an aft liner panel mounted to the support shell aft of the forward liner panel via a multiple of studs, the aft liner panel including a forward rail that extends linearly from a cold side of the aft liner panel adjacent to said aft rail such that an aft surface of the aft rail and a forward surface of the forward rail form an interface passage having a predefined gap space; and
   a multiple of heat transfer features that extend across the interface passage from at least one of the aft surface and the forward surface to the other of the aft surface and the forward surface facilitating the predefined gap space, the interface passage oriented at an angle between 20-80 degrees with respect to a hot side of the aft liner panel.

2. The combustor as recited in claim 1, wherein the multiple of heat transfer features extend across the interface passage from the forward surface to the aft surface.

3. The combustor as recited in claim 1, wherein the multiple of heat transfer features comprise a first heat transfer feature that abuts a second heat transfer feature across the interface passage.

4. The combustor as recited in claim 1, wherein the multiple of heat transfer features are arranged in rows.

5. The combustor as recited in claim 4, wherein at least one of the multiple of heat transfer features is shaped as a pin.

6. The combustor as recited in claim 1, wherein the aft surface of the aft rail that faces the interface passage is contiguous with a hot side of the forward liner panel.

7. The combustor as recited in claim 1, wherein the forward surface of the forward rail that faces the interface passage is contiguous with a hot side of the aft liner panel.

8. The combustor as recited in claim 1, wherein the aft surface of the aft rail that faces the interface passage is contiguous with a hot side of the forward liner panel and the forward surface of the forward rail that faces the interface passage is contiguous with a hot side of the aft liner panel.

9. The combustor as recited in claim 1, wherein the interface passage is oriented at an angle to an axial gaspath flow through the combustor.

10. The combustor as recited in claim 1, wherein the interface passage extends to the hot side of the aft liner panel.

11. A method for cooling a combustor liner panel in a combustor for a gas turbine engine, the combustor comprising:
   a support shell;
   a forward liner panel mounted to the support shell via a multiple of studs, the forward liner panel including an aft rail that extends from a cold side of the forward liner panel;
   an aft liner panel mounted to the support shell aft of the forward liner panel via a multiple of studs, the aft liner panel including a forward rail that extends from a cold side of the aft liner panel adjacent to said aft rail such that an aft surface of the aft rail and a forward surface of the forward rail form an interface passage having a predefined gap space; and
   a multiple of heat transfer features that extend across the interface passage from at least one of the aft surface and the forward surface to the other of the aft surface and the forward surface facilitating the predefined gap space, the interface passage oriented at an angle between 20-80 degrees with respect to a hot side of the aft liner panel;
   communicating airflow through the interface passage.

12. The method as recited in claim 11, further comprising communicating the airflow through the interface passage at an angle toward a downstream liner panel to increase surface attachment thereto.

* * * * *